United States Patent
Liu et al.

(10) Patent No.: US 12,330,060 B2
(45) Date of Patent: Jun. 17, 2025

(54) OBJECT SELECTION METHOD AND APPARATUS

(71) Applicant: NETEASE (HANGZHOU) NETWORK CO., LTD., Zhejiang (CN)

(72) Inventors: Jiancong Liu, Zhejiang (CN); Qihua Luo, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 224 days.

(21) Appl. No.: 17/759,376

(22) PCT Filed: Aug. 7, 2020

(86) PCT No.: PCT/CN2020/107948
§ 371 (c)(1),
(2) Date: Jul. 24, 2022

(87) PCT Pub. No.: WO2021/237942
PCT Pub. Date: Dec. 2, 2021

(65) Prior Publication Data
US 2023/0066930 A1  Mar. 2, 2023

(30) Foreign Application Priority Data

May 25, 2020  (CN) .......................... 202010450283.5

(51) Int. Cl.
*A63F 13/537* (2014.01)
*A63F 13/42* (2014.01)
(Continued)

(52) U.S. Cl.
CPC ............ *A63F 13/537* (2014.09); *A63F 13/42* (2014.09); *A63F 13/55* (2014.09); *G06F 3/0482* (2013.01)

(58) Field of Classification Search
CPC .............. G06F 3/04842; G06F 3/0482; G06F 3/04883; A63F 13/533; A63F 13/537; A63F 13/55; A63F 13/42
See application file for complete search history.

(56) References Cited

U.S. PATENT DOCUMENTS

2014/0315636 A1   10/2014  Zarfati et al.
2018/0121009 A1   5/2018   Feng
(Continued)

FOREIGN PATENT DOCUMENTS

CN    105487805 A    4/2016
CN    105867684 A    8/2016
(Continued)

OTHER PUBLICATIONS

Dialog/ProQuest English Translation of CN109771941 Retrieved on Sep. 4, 2024, (Year 2024) (28 Pages).*
(Continued)

*Primary Examiner* — Robert E Mosser
(74) *Attorney, Agent, or Firm* — Qinghong Xu

(57) ABSTRACT

Provided are an object selection method and apparatus. The method comprises: in response to a first operation acting on a graphical user interface, acquiring a detection region corresponding to the first operation; acquiring at least one game interactive object which overlaps the detection region; performing controlling to provide at least one selection control in a display region corresponding to the first operation, wherein each selection control corresponds to one game interactive object; and in response to a selection operation acting on the at least one selection control, executing an interaction operation of the game interactive object corresponding to the selection control.

17 Claims, 20 Drawing Sheets

(51) Int. Cl.
*A63F 13/55* (2014.01)
*G06F 3/0482* (2013.01)

(56) References Cited

U.S. PATENT DOCUMENTS

| | | |
|---|---|---|
| 2019/0114044 A1 | 4/2019 | Jiao et al. |
| 2020/0122032 A1 | 4/2020 | Matsui et al. |

FOREIGN PATENT DOCUMENTS

| | | |
|---|---|---|
| CN | 106662978 A | 5/2017 |
| CN | 108733275 A | 11/2018 |
| CN | 109771941 A | 5/2019 |
| CN | 109847355 A | 6/2019 |
| CN | 110052021 A | 7/2019 |
| CN | 110237534 A | 9/2019 |
| JP | 2014041525 A | 3/2014 |
| WO | 2014098207 A1 | 6/2014 |
| WO | 2020181867 A1 | 9/2020 |

OTHER PUBLICATIONS

International Search Report dated Feb. 24, 2021 of PCT International Application No. PCT/CN2020/107948.
First Office Action dated Jan. 28, 2021 of Chinese Patent No. 202010450283.5.
Notice of Allowance dated May 20, 2021 of Chinese Patent No. 202010450283.5.
Notice of Reasons Rejection dated Jun. 20, 2023 of Japanese Application No. 2022-525832.

\* cited by examiner

OBJECT SELECTION METHOD AND APPARATUS

CROSS REFERENCE

The present disclosure is based upon International Application No. PCT/CN2020/107948, filed on Aug. 7, 2020, which is based upon and claims priority to Chinese Patent Application No. 202010450283.5, filed on May 25, 2020, entitled "OBJECT SELECTION METHOD AND APPARATUS", the entire contents of which are incorporated herein by reference in its entirety.

TECHNICAL FIELD

The present disclosure relates to the field of computer technology, and in particular, to an object selection method and apparatus.

BACKGROUND

With continuous development of games, if the user can select the interaction objects in the game simply and efficiently in the one-handed operation mode, the user experience can be effectively improved.

At present, in the related art, in the case of ensuring the one-handed operation of the user, when the selection of interaction objects in the game is implemented, the interaction objects of the game are usually classified and typeset, and the classified and typeset game interactive objects are placed in the one-handed easy-to-operate region, allowing the users to click with one hand.

SUMMARY

The purpose of the present disclosure is to provide an object selection method and apparatus.

According to a first aspect of the present disclosure, there is provided an object selection method, wherein a graphical user interface is provided through a first terminal device, the graphical user interface includes a game screen, and the game screen includes at least one game interactive object, the method includes: acquiring a detection region corresponding to a first operation in response to the first operation acting on the graphical user interface; acquiring at least one game interactive object overlapping with the detection region; controlling to provide at least one selection control in a display region corresponding to the first operation, wherein each selection control corresponds to one game interactive object; and executing an interaction operation of the game interactive object corresponding to the selection control in response to a selection operation acting on the at least one selection control.

According to a second aspect of the present disclosure, there is provided an object selection apparatus, providing a graphical user interface through a first terminal device, the graphical user interface including a game screen, and the game screen including at least one game interactive object, the apparatus including: an acquisition module configured to acquire a detection region corresponding to a first operation in response to the first operation acting on the graphical user interface; the acquisition module further configured to acquire at least one game interactive object overlapping with the detection region; a providing module configured to control to provide at least one selection control in a display region corresponding to the first operation, wherein each selection control corresponds to one game interactive object; and a processing module configured to, execute an interaction operation of the game interactive object corresponding to the selection control in response to a selection operation acting on the at least one selection control.

According to a third aspect of the present disclosure, there is provided an object selection device including: a memory for storing programs; a processor for executing the program stored in the memory, wherein the processor performs the method according to the first aspect and each possible implementation of the first aspect when the program is executed.

According to a fourth aspect of the present disclosure, there is provided a non-transitory computer readable storage medium, including instructions which cause a computer to perform the method according to the first aspect and each possible implementation of the first aspect when run on the computer.

BRIEF DESCRIPTION OF THE DRAWINGS

In order to more clearly illustrate the technical solutions in the embodiments of the present application or in the related art, the accompanying drawings used in the description of the embodiments or the related art will be briefly introduced in the following. The accompanying drawings in the following description are some embodiments of the present application. For those of ordinary skill in the art, other drawings can also be obtained from these drawings without any creative effort.

DETAILED DESCRIPTION

Figure 1A:
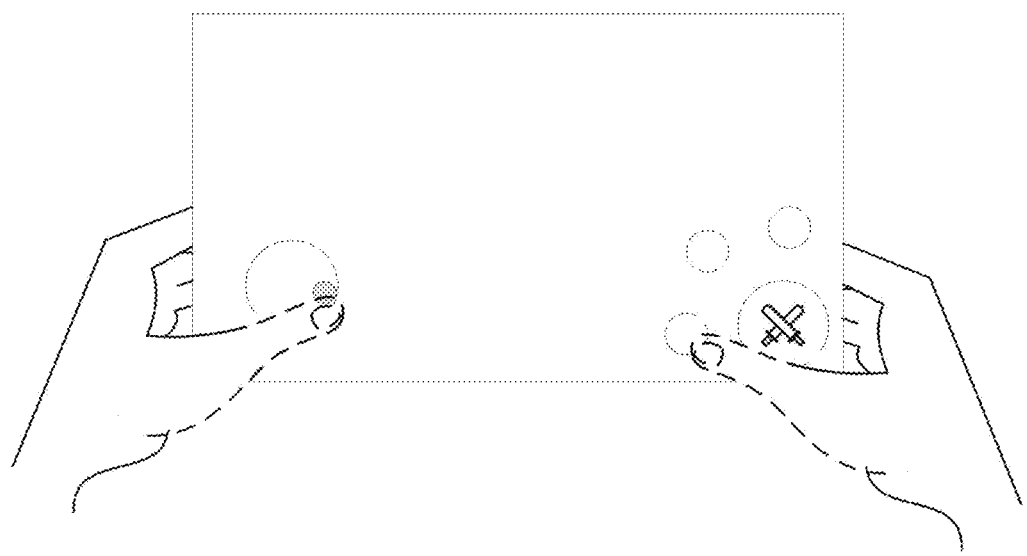
FIG. 1A is a schematic diagram of a horizontal screen presentation mode provided by an embodiment of the present application.

In order to make the purposes, technical solutions and advantages of the embodiments of the present application clearer, the technical solutions in the embodiments of the present application will be described clearly and completely below with reference to the drawings in the embodiments of the present application. The described embodiments are a part of the embodiments of the present application, but not all of the embodiments. Based on the embodiments in the present application, all other embodiments obtained by those of ordinary skill in the art without creative work fall within the protection scope of the present application.

The object selection method in this embodiment of the present application may run on a terminal device or a cloud interaction system.

The cloud interaction system includes a cloud server and user device for running cloud applications. Cloud applications run separately.

In an optional implementation, the cloud game refers to a game mode based on cloud computing. In the running mode of the cloud game, the running main body of the game program is separated from the presentation main body of the game screen. The storage and running of the object selection method are completed on the cloud game server. The cloud game client is used for data reception and transmission and presentation of the game screen. For example, the cloud game client can be a display device with a data transmission function close to the user side, such as a mobile terminal, a TV, a computer, a handheld computer, etc.; while a terminal device that processes game data is a cloud game server in the cloud. When playing the game, the player operates the cloud game client to send operation instructions to the cloud game server. The cloud game server runs the game according to the operation instructions, encodes and compresses the game screen and other data, and returns it to the cloud game client through the network. Finally, the cloud game client decodes and outputs the game screen.

In an optional implementation, the terminal device may be a local terminal device. The local terminal device stores the game program and is used to present the game screen. The local terminal device is used to interact with the player through a graphical user interface, that is, conventionally, the game program is downloaded, installed and executed through an electronic device. The local terminal device may provide the graphical user interface to the player in various ways, for example, it may be rendered and displayed on the display screen of the terminal, or provided to the player through holographic projection. For example, the local terminal device may include a display screen and a processor. The display screen is used for presenting a graphical user interface, and the graphical user interface includes game screens. The processor is used for running the game, generating the graphical user interface, and controlling display of the graphical user interface on the display screen.

The background technology involved in this application is introduced in detail below.

Figure 1B:
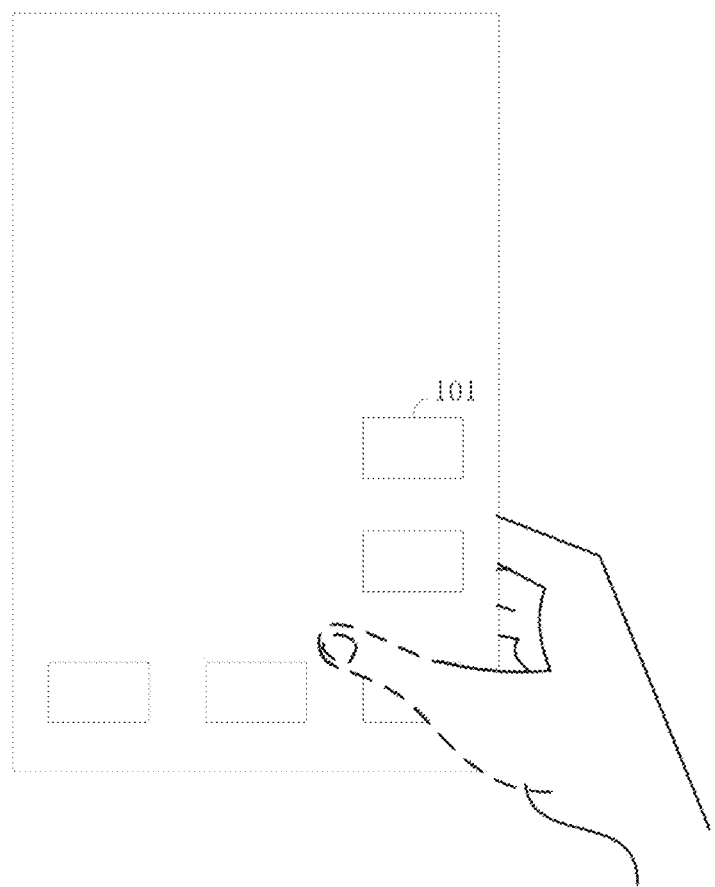
FIG. 1B is a schematic diagram of a vertical screen presentation mode provided by an embodiment of the present application.

At present, mobile games on the mobile terminal can have two presentation modes: horizontal screen and vertical screen. The two presentation modes of horizontal screen and vertical screen have their own characteristics, and their implementation can be as shown in FIG. 1A and FIG. 1B. FIG. 1A is a schematic diagram of a horizontal screen presentation mode provided by an embodiment of the present application, and FIG. 1B is a schematic diagram of a vertical screen presentation mode provided by an embodiment of the present application.

Referring to FIG. 1A, a mobile game in a horizontal screen presentation mode, for example, may have better image impact and larger operation space.

Referring to FIG. 1B, the operation mode of the mobile game in the vertical screen presentation mode more conforms to the user's operation habit of using a terminal device. Usually, only one hand can perform most game operations in a complex environment.

In the actual implementation process, it is possible to choose a horizontal screen presentation mode or a vertical screen presentation mode according to the type of the game and the operation mode.

In a possible implementation, since the vertical screen presentation mode is easy to operate with one hand, most casual games, placement games, etc. use the vertical screen presentation mode currently.

However, due to the size of the terminal device, numerous functional requirements and performance requirements of the game, it is inevitable to place some game interactive objects in a region of the screen that is not easily accessible with one hand during the design of the game, which will weaken the advantage of one-handed operation of the vertical screen presentation mode.

At present, in order to ensure the advantages of the vertical screen presentation mode, a plurality of game interactive objects are usually classified and typeset in the related art, and the classified and typeset game interactive objects are placed in an easy-to-operate region on the screen. The position of the game interactive object is adjusted to a position that is easy to operate with one hand, so as to facilitate the user's one-handed operation.

For example, please refer to FIG. 1B, FIG. 1B shows a plurality of classified and typeset game interactive objects. Taking the classified and typeset game interactive object 101 as an example, in a possible implementation, when a user click operation on the classified and typeset game interactive object 101 is received, for example, a plurality of classified game interactive objects may be displayed again, and then the user further selects a certain game interactive object, thereby facilitating the user's one-handed operation.

However, at present, the screen size of the terminal device is getting larger and larger, and the selection of all game interactive objects cannot be effectively realized in the case of one-handed operation only by adjusting the position of the game interactive object. Besides, with the complexity of the game opening function, in the layout of the game interactive objects, it is also necessary to place different game interactive objects in different regions to facilitate the user's understanding.

Based on the problems in the related art, the present application provides an object selection method, so as to realize simple and efficient selection of each game interactive object in the case of one-handed operation.

Figure 2:
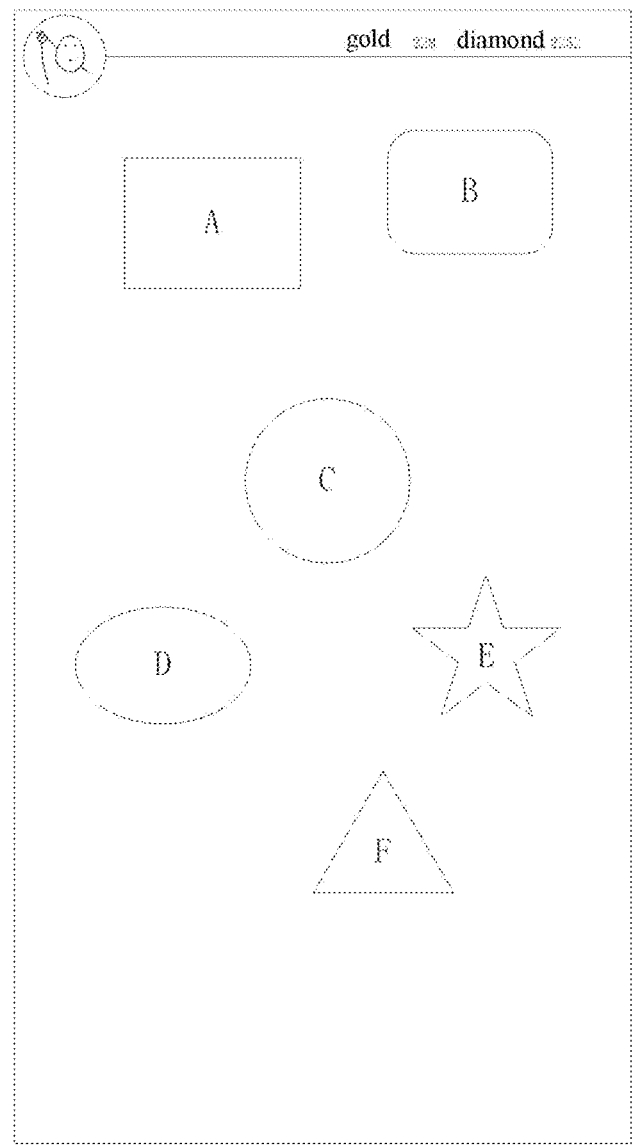
FIG. 2 is a schematic diagram of a graphical user interface provided by an embodiment of the present application.

The following describes an application scenario of the present application with reference to FIG. 2. FIG. 2 is a schematic diagram of a graphical user interface provided by an embodiment of the present application.

Specifically, this embodiment provides a graphical user interface through the first terminal device, where the graphical user interface includes a game screen, and the game screen includes at least one game interactive object.

The first terminal device may be the aforementioned local terminal device, or may be the aforementioned cloud game client.

A graphical user interface refers to a computer operating user interface displayed in a graphical manner, which allows the player to use an input device to manipulate icons or menu controls on the screen. The input device may be, for example, a mouse, or a touch screen, etc., which is not limited in the present application. The players interact with the client or server by operating through a graphical user interface during the game.

In this embodiment, the graphical user interface includes a game screen, and the game screen includes at least one game interactive object, where the game interactive object may be an interactive object in the game screen.

In a possible implementation, the game interactive object can be, for example, a game entry. By interacting with the game entry, the game can be triggered to enter a corresponding function module.

Alternatively, the game interactive object may also be, for example, a virtual object in the game, such as a game character controlled by a user's operation, or a non-player character, or a tree, house, flower, etc. in the game.

Alternatively, the game interactive object can also be, for example, a preset button, a preset control, etc. in the game. This embodiment does not limit the specific implementation of the game interactive object. Any object that can interact in the game can be used as the game interactive object in this embodiment.

In a possible implementation, for example, referring to FIG. 2, it is assumed that there are 6 game interactive objects in the current game screen, namely A, B, C, D, E, and F. In the current example, there is no specific limitation on what each game interactive object is. For example, it can be the game entry introduced above, or it can also be the virtual object introduced above, which is not limited here. In this embodiment, the shape, size, position, etc. of the game interactive object is not limited either, and it can be selected according to the specific game design.

Figure 3:
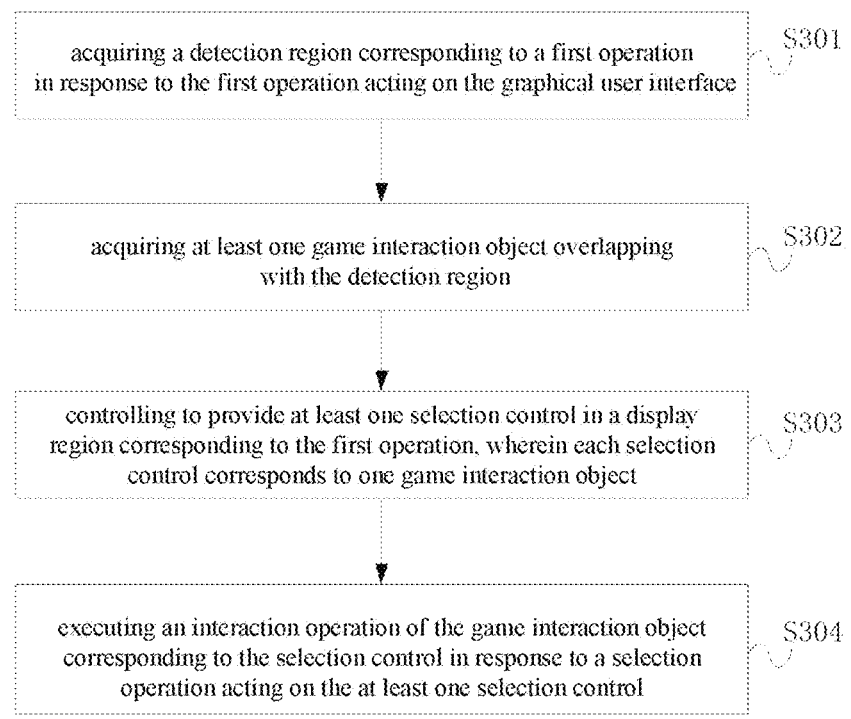
FIG. 3 is a flowchart of an object selection method provided by an embodiment of the present application.
Figure 4:
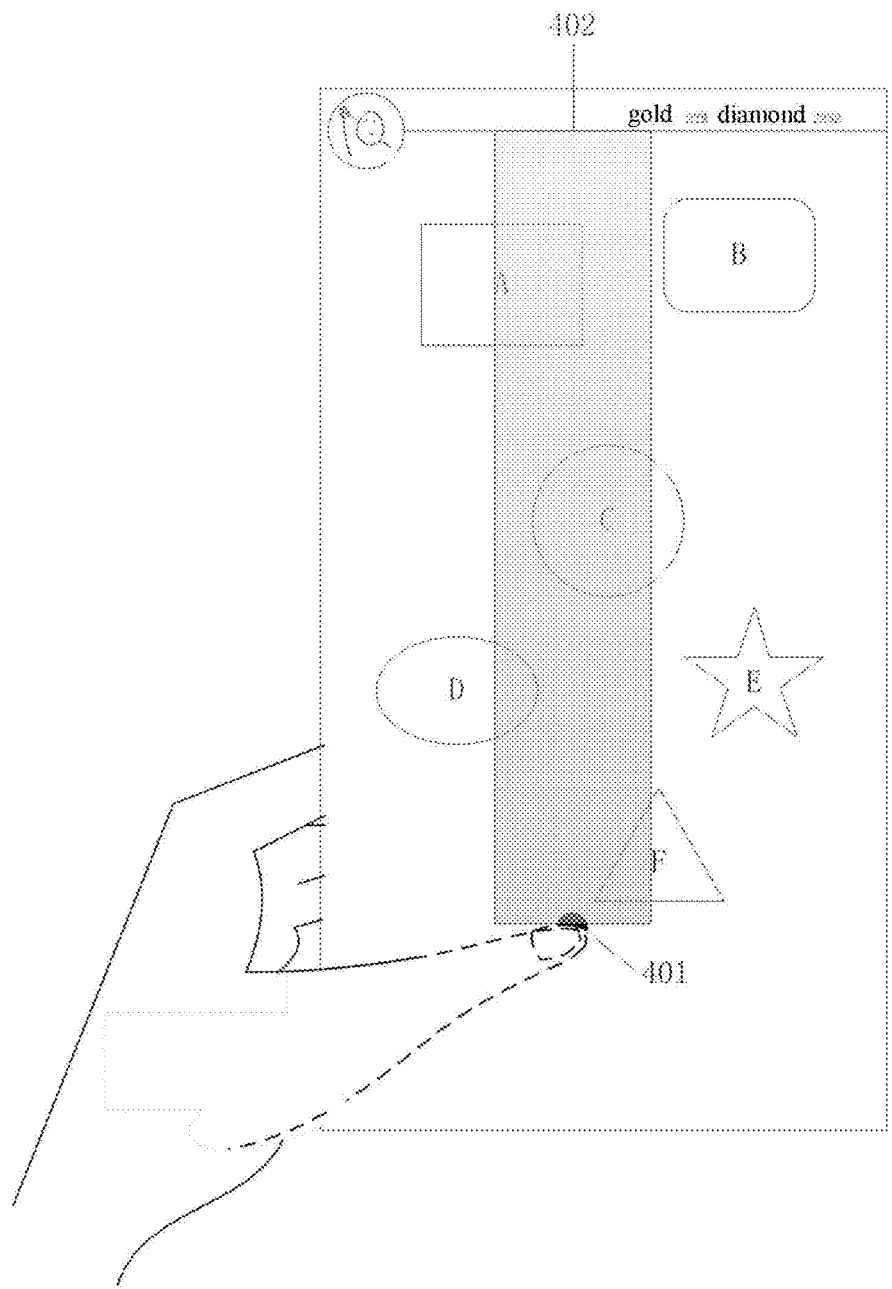
FIG. 4 is a schematic diagram of a detection region provided by an embodiment of the present application.
Figure 5:
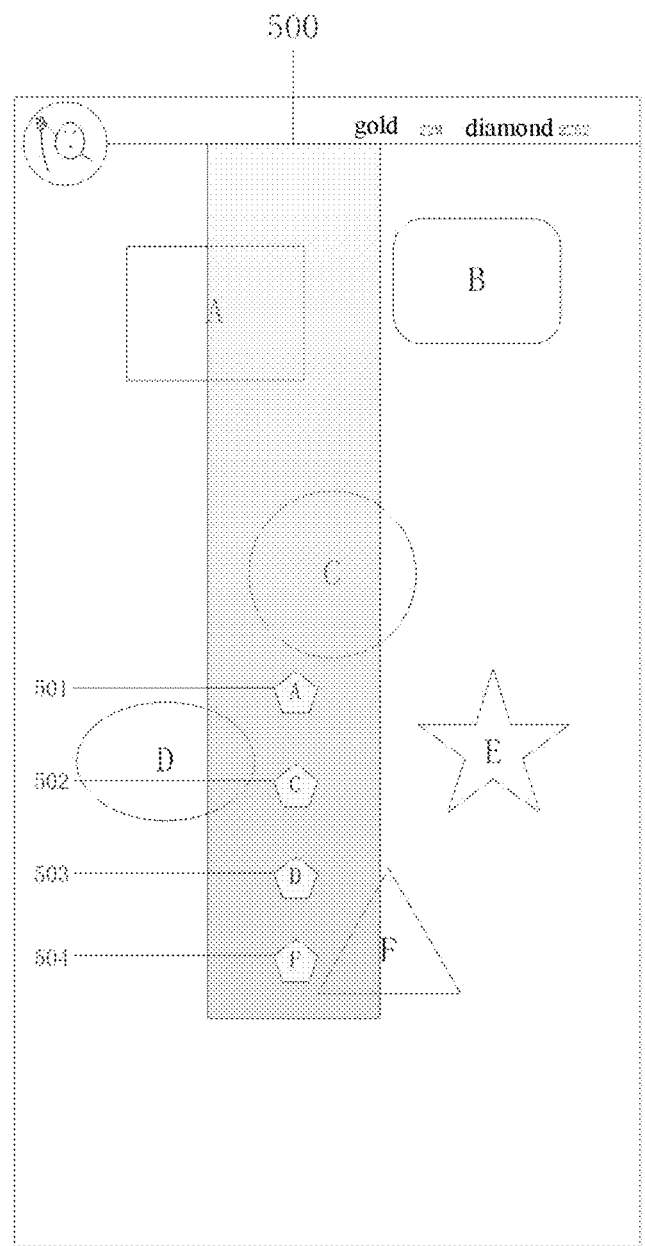
FIG. 5 is a schematic diagram of an implementation of a selection control provided by an embodiment of the present application.
Figure 6:
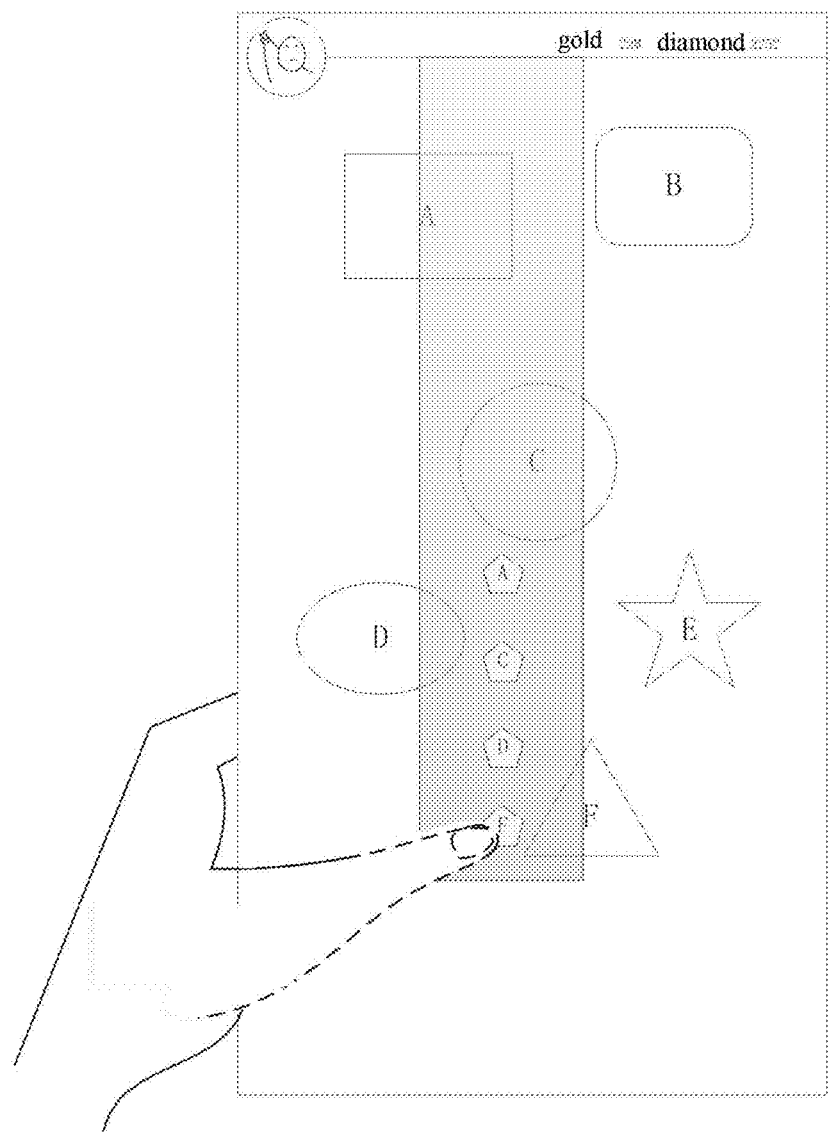
FIG. 6 is a schematic diagram of a selection operation provided by an embodiment of the present application.

On the basis of the above-mentioned graphical user interface, the following describes the object selection method provided by the present application with reference to FIG. 3 to FIG. 7. FIG. 3 is a flowchart of an object selection method provided by an embodiment of the present application, FIG. 4 is a schematic diagram of a detection region provided by an embodiment of the present application, FIG. 5 is a schematic diagram of an implementation of a selection control provided by an embodiment of the present application, and FIG. 6 is a schematic diagram of a selection operation provided by an embodiment of the present application.

As shown in FIG. 3, the method includes following steps.

S301, a detection region corresponding to a first operation is acquired in response to the first operation acting on the graphical user interface.

In this embodiment, the first operation may be, for example, a click operation, or the first operation may also be a long-press operation, a sliding operation, etc. In the embodiment, the first operation may act on any position in the graphical user interface. The implementation and action location of the first operation are not limited in the present embodiment.

By responding to the first operation, the detection region corresponding to the first operation is acquired. In a possible implementation, for example, the detection region corresponding to the touch point of the first operation may be acquired.

For example, a touch point of the first operation may be used as a starting point, and a region with a preset length and/or a preset width in a preset direction of the first operation may be determined as the detection region.

The current implementation is described below in conjunction with FIG. 4.

It is assumed that the touch point of the current first operation is located at the position shown by 401 in FIG. 4, the touch point 401 of the first operation can be used as the starting point, and the region 402 with the preset width and the preset length above the first operation can be used as the detection region.

In a possible implementation, the detection region may be displayed in a preset state. In the embodiment, for example, the preset state may be the state of the light bar shown in FIG. 4, or it may also be any of the states of highlighting, floating window, etc. By displaying the detection region in a preset state, the user can quickly and clearly determine the location of the detection region, so as to make timely adjustment. This embodiment does not specifically limit the implementation of the preset state, as long as it can identify the detection region.

Alternatively, a region having a mapping relationship with the touch point of the first operation may also be determined as the detection region; or, a region of a preset range around the touch point of the first operation may also be determined as the detection region, or the like.

This embodiment does not limit the specific relationship between the detection region and the first operation, which can be expanded according to actual requirements.

S302, at least one game interactive object overlapping with the detection region is acquired.

In this embodiment, the detection region is a region in a graphical user interface, and game interactive objects also correspond to their respective regions in the graphical user interface, so the detection region may overlap with some game interactive objects.

In the embodiment, overlapping with the detection region may mean that, for example, the game interactive object is completely located within the detection region; or, for example, a part of the game interactive object is located within the detection region.

For example, referring to FIG. 4, it is assumed that the current detection region is the region shown in 402, and that there are currently 6 game interactive objects A, B, C, D, E, and F. As for the region corresponding to each game interactive object, for example, as shown in FIG. 4, the game interactive object can be any shape such as a square, a circle, and a triangle.

In other possible implementations, the game interactive object may also have an irregular shape. The shape of the game interactive object is not limited in this embodiment, and the region corresponding to the game interactive object in the graphical user interface may be selected according to the actual game setting.

Based on the example in FIG. 4, the game interactive objects that currently overlap with the detection region are A, C, D, and F.

In this embodiment, all game interactive objects that intersect with the detection region can be determined as the game interactive objects that overlap with the detection region in this embodiment, regardless of the size of the intersection.

S303, it is controlled to provide at least one selection control in a display region corresponding to the first operation, wherein each selection control corresponds to one game interactive object.

In this embodiment, the user can determine the required detection region according to the touch point of the first operation through the movement of the first operation, and in this embodiment, at least one game interactive object that overlaps with the detection region can be acquired. There is a game interactive object to be selected by the user in the at least one game interactive object acquired at the time.

In order to facilitate the user to select the desired game interactive object with one hand, at least one selection control may be provided in the display region corresponding to the first operation, wherein each selection control corresponds to a game interactive object.

In the embodiment, the game interactive object corresponding to each game object provided in the display region is the game interactive object that overlaps with the detection region described above. Therefore, selection of the game interactive object desired by the user can be achieved simply and efficiently through the selection control.

In a possible implementation, the display region corresponding to the first operation and the detection region corresponding to the first operation described above may be the same region, but the functions of the display region and the detection region are different. Alternatively, the display region corresponding to the first operation may also be a region different from the detection region. The implementation of acquiring the display region may be similar to the implementation of acquiring the detection region described above, which will not be repeated here.

In one embodiment, the selection control may be provided in the display region after the first operation is completed; or the selection control may also be provided in the display region in response to a trigger operation acting on the graphical user interface. The trigger operation may be, for example, a click operation, a long-press operation, or the like acting on at any position in the graphical user interface, which is not limited by this embodiment.

In the following, the detection region and the display region as the same region.

It is assumed that the above example continues to be used, the game interactive objects that currently overlap with the detection region are A, C, D, and F, then, for example, referring to FIG. 5, there are four selection controls provided in the display region 500 corresponding to the first region currently, which are 501, 502, 503, and 504 respectively. The selection control 501 corresponds to the game interactive object A, the selection control 502 corresponds to the game interactive object C, the selection control 503 corresponds to the game interactive object D, and the selection control 504 corresponds to the game interactive object F.

By providing selection controls for each game interactive object that overlaps with the detection region in the display region, the user can quickly and conveniently select the desired game interactive objects in the one-handed mode.

In a possible implementation, after acquiring the game interactive objects that overlap with the detecting region, the object identifier of each game interactive object that overlap with the detecting region may also be acquired. The object identifier may be, for example, the name of the object, for example A, B, C, etc. as shown in FIG. 4. Alternatively, the object identifier can also be the shortened form, abbreviation, code, digital identifier, etc. of the object. This embodiment does not limit the implementation of the object identifier, as long as the object identifier can uniquely indicate a game interactive object.

In this embodiment, the object identifier of the game interactive object corresponding to each selection control may also be displayed around each selection control. For example, referring to FIG. 5, the object identifier of the corresponding game interactive object may be displayed in each selection control; or the object identifier of the corresponding game interactive object may also be displayed above, below, and at the side of each selection control, and at positions where there is a mapping relationship. This embodiment does not limit the position where the object identifier of the corresponding game interactive object is displayed.

By displaying the object identifier of the corresponding game interactive object around the selection control, the user can quickly and efficiently determine which game interactive object corresponds to the selection control, thereby improving the operation efficiency of the game and improving the user's game experience.

In the implementation described in above FIG. 5, the selection control is pentagon. In the actual implementation process, the shape, color, position, size, arrangement, etc. of the selection control can be selected according to actual needs. The presentation mode of the selection controls is not limited by the present embodiment, as long as the selection control can correspond to each game interactive object that overlaps with the detection region.

S304, an interaction operation of the game interactive object corresponding to the selection control is executed in response to a selection operation acting on the at least one selection control.

The selection operation acting on the selection control may be, for example, a click operation acting on a certain selection control, or a long-press operation acting on a certain selection control, or a sliding selection operation acting on a plurality of selection controls. The specific implementation of the selection operation is not limited in this embodiment, as long as the selection operation can realize the selection of at least one selection control.

In this embodiment, in response to the selection operation, the interaction operation of the game interactive object corresponding to the selection control can be performed.

For example, if the current game interactive object is the game entry, the interaction operation may be entering the game module corresponding to the game entry; or if the current game interactive object is a virtual game object, the interaction operation may be selecting the virtual game object, or controlling the virtual game object to perform operations, etc. The interaction operation of the game interactive object may be set according to the specific type of the game interactive object, which is not limited here.

For example, if the game interactive object is the game entry, referring to FIG. 6, assuming that the current selection operation is a click operation, and the selection operation acts on the selection control corresponding to the game interactive object F, then it is determined to select the game entry corresponding to F, and then, the game is controlled to enter the game module corresponding to "F".

In this embodiment, each game interactive object is placed in different positions, which can facilitate the user's understanding of the game. On the basis that the position of the game interactive object does not need to be changed, the selection of game interactive objects can be achieved through the overlapping of the detection region and the game interactive object, so as to effectively realize one-handed operation in the vertical screen mode.

The object selection method provided by the embodiment of the present application includes: in response to a first operation acting on a graphical user interface, acquiring a detection region corresponding to the first operation; acquiring at least one game interactive object which overlaps the detection region; controlling to provide at least one selection control in a display region corresponding to the first operation, wherein each selection control corresponds to one game interactive object; and in response to a selection operation acting on the at least one selection control, executing an interaction operation of the game interactive object corresponding to the selection control. By means of acquiring a detection region corresponding to a first operation and by means of acquiring at least one game interactive object which overlaps the detection region, a selection control corresponding to each game interactive object can be provided in a display region, and the selection of a game interactive object is realized on the basis of the selection control, such that the selection of each game interactive object can be realized quickly and conveniently when a single-handed operation is implemented.

On the basis of the above-mentioned embodiment, the object selection method provided by the present application may also provide a first control in the graphical user interface, and when the detection region corresponding to the first operation is acquired, the acquisition may be performed based on the first control. For example, the first control may be pre-displayed in the graphical user interface, or, the first control may also be not displayed or does not exist in advance, and will be displayed after being triggered by a related operation. The implementation of acquiring the detection region based on the first control will be described below with reference to specific embodiments.

Figure 7:
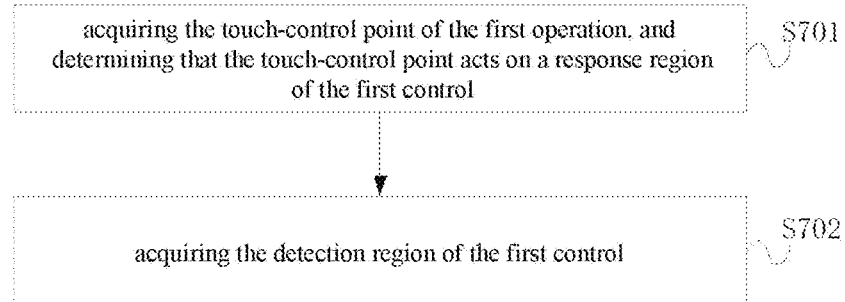
FIG. 7 is a flowchart of an object selection method provided by another embodiment of the present application.
Figure 8:
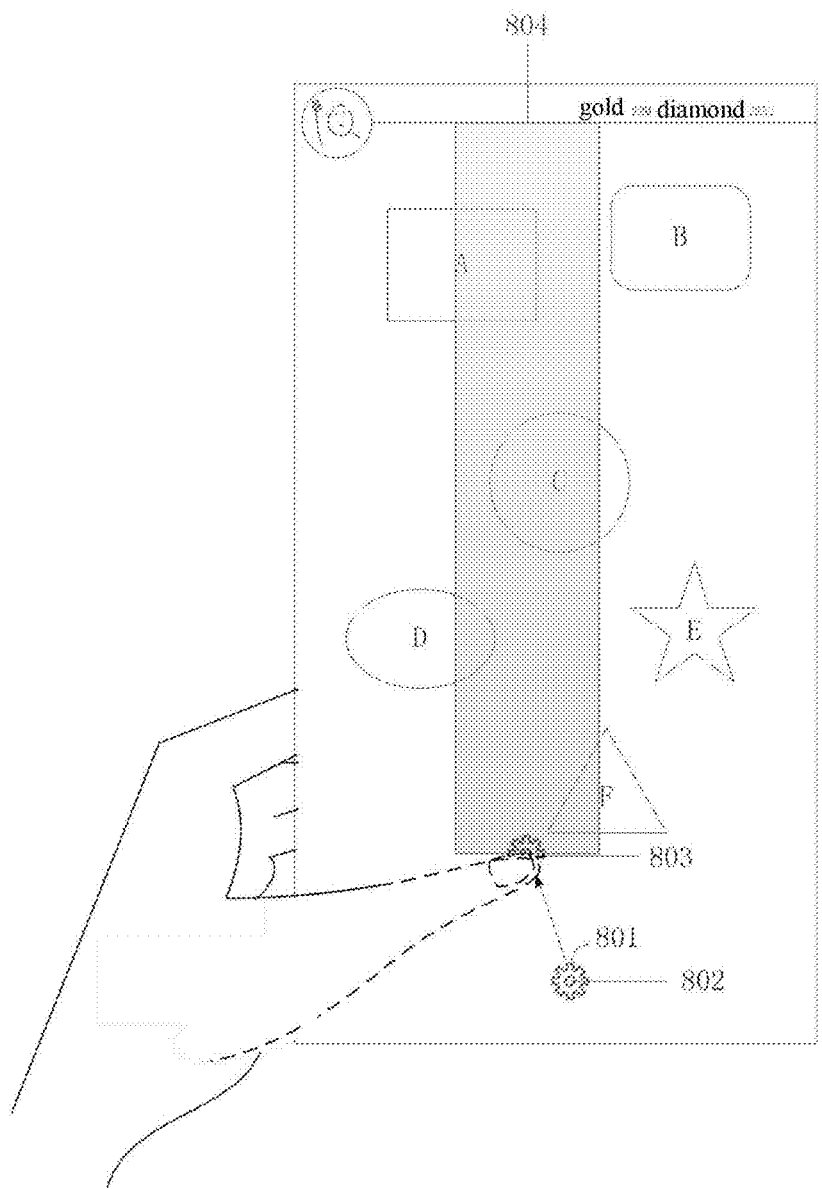
FIG. 8 is a schematic diagram of a first control provided by an embodiment of the present application.

First, the implementation of pre-displaying the first control in the graphical user interface will be described with reference to FIG. 7 and FIG. 8. In a possible implementation, the first control may be pre-displayed at any position in the graphical user interface. FIG. 7 is a flowchart of an object selection method provided by another embodiment of the present application, and FIG. 8 is a schematic diagram of a first control provided by an embodiment of the present application.

In a possible implementation, said acquiring a detection region corresponding to a touch point of the first operation may include:

S701, acquiring the touch point of the first operation, and determining that the touch point acts on a response region of the first control.

In this embodiment, the response region of the first control may be a full-screen response region. For example, all regions of the current graphical user interface are the response region of the first control. Alternatively, the response region of the first control may also be part regions of the graphical user interface, such as the region around the first control, or the edge region corresponding to the first control, etc. This embodiment does not limit the specific implementation of the response region, as long as there is a corresponding relationship between the response region and the first control.

Referring to FIG. 8, the graphical user interface includes a first control 801. The first control 801 is pre-displayed at any position in the graphical user interface. The sliding button 801 can be moved to any position in the graphical user interface according to the user's first operation. In the actual implementation process, the size, initial position and shape of the sliding button 801 can be selected according to actual needs.

Assuming that the response region of the first control is a full-screen response region currently, and the touch point of the first operation is moved from the position of 802 to the position of 803 in FIG. 8 currently, then the touch point of the first operation currently acquired is the position corresponding to 803 in FIG. 8. At this time, it can be determined that the touch point 803 acts on the response region of the first control.

S702, the detection region of the first control is acquired.

In a possible implementation, the position of the first control may be adjusted according to the movement of the touch point, and the corresponding detection region may be determined according to the position of the first control.

For example, referring to FIG. 8, the position of the first control is adjusted from 802 to 803 according to the movement of the touch point. At this time, for example, a region with a preset length and/or a preset width in a preset direction corresponding to the first control can be acquired, and this region is determined as the detection region, such as the region 804 shown in FIG. 8.

By adjusting the position of the first control according to the movement of the touch point to determine the detection region according to the movement of the first control, a more intuitive process of determining the detection region can be provided for the user, thereby facilitating the user to determine the detection region.

On the basis of the above-mentioned embodiment, the graphical user interface in this application may further include a sliding region, where the sliding region may be an edge region of the game screen. In another possible implementation, the first control may be pre-displayed in the sliding region in the graphical user interface. The implementation of acquiring the detection region when the first control is displayed in the sliding region will be described below with reference to specific embodiments.

It should be noted here that the sliding region in this application is not necessarily a response region, and the response region in this application includes a sliding region.

Figure 9:
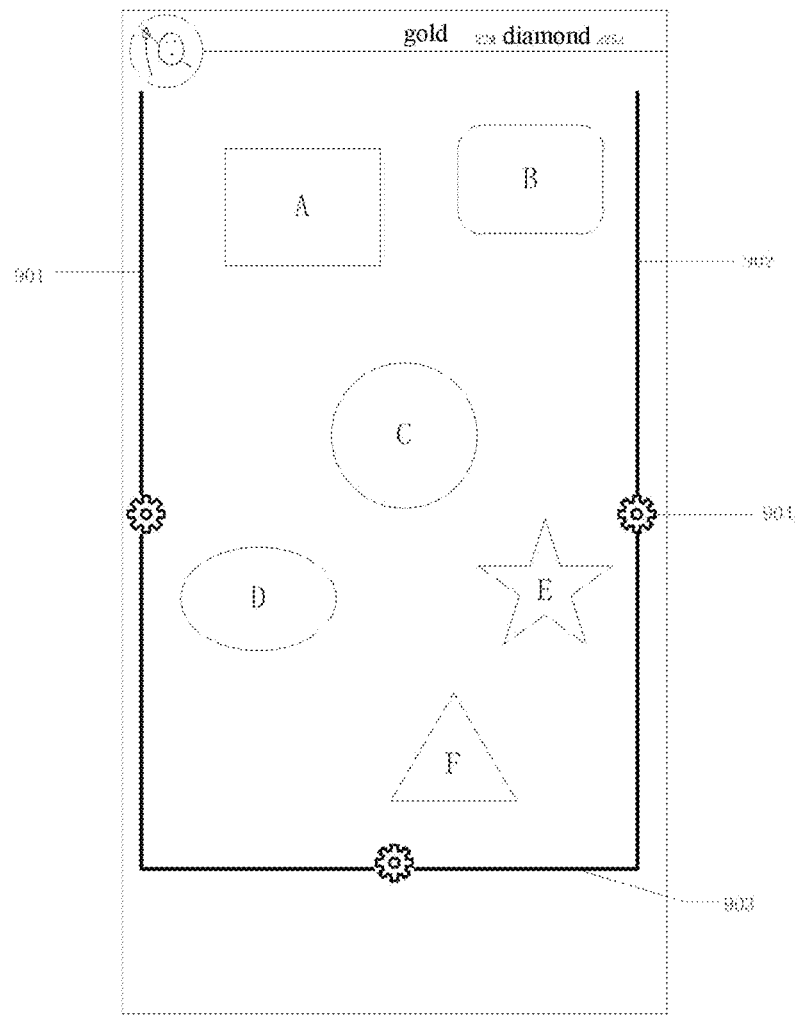
FIG. 9 is a schematic diagram of a sliding region provided by an embodiment of the present application.
Figure 10:
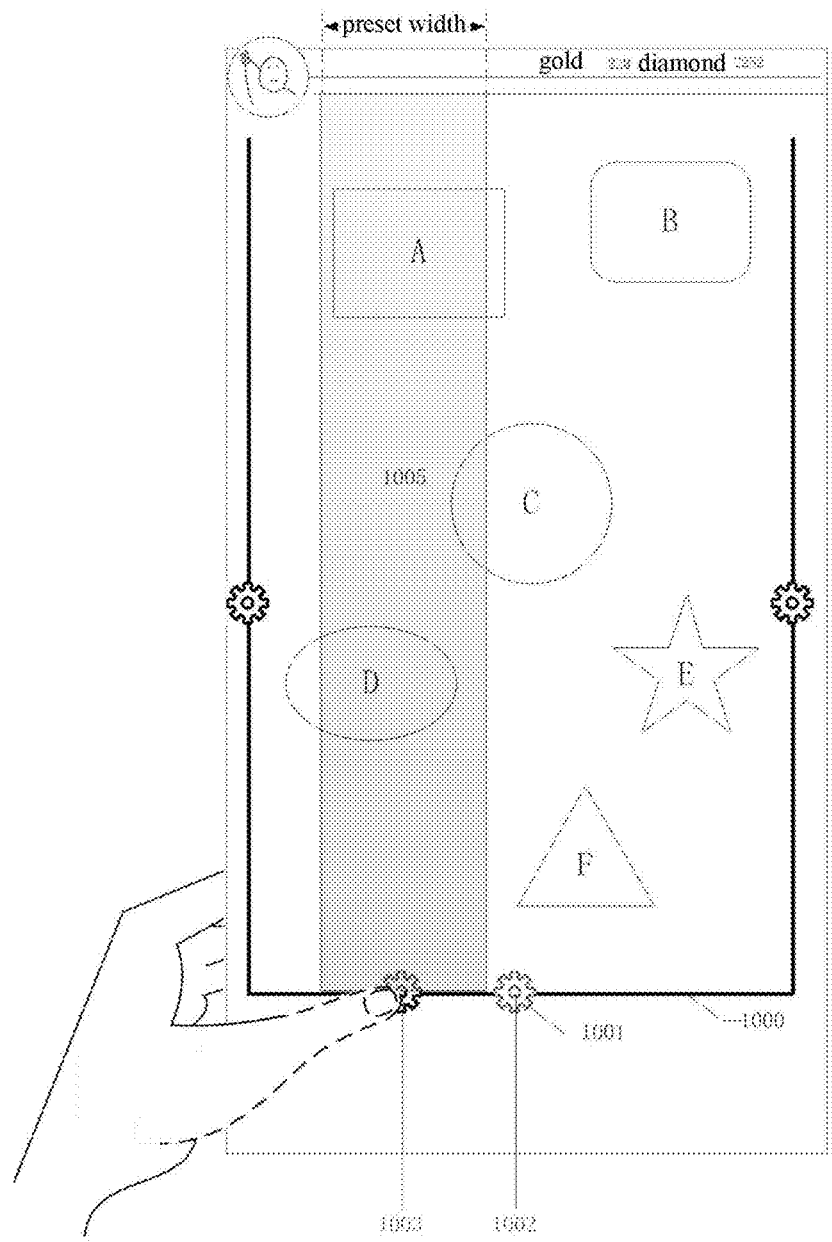
FIG. 10 is a schematic diagram of determining a detection region based on a horizontal sliding region provided by an embodiment of the present application.
Figure 11:
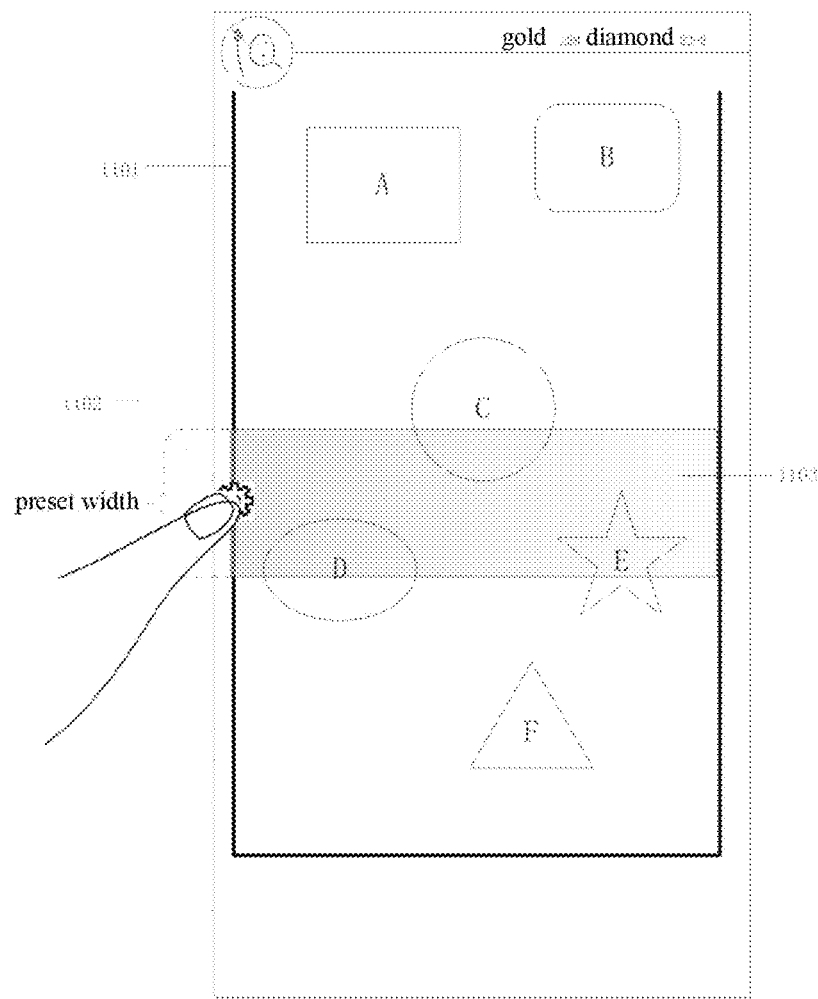
FIG. 11 is a schematic diagram of determining a detection region based on a longitudinal sliding region provided by an embodiment of the present application.

Description will be made with reference to FIG. 9-FIG. 11, FIG. 9 is a schematic diagram of a sliding region provided by an embodiment of the present application, FIG. 10 is a schematic diagram of determining a detection region based on a horizontal sliding region provided by an embodiment of the present application, and FIG. 11 is a schematic diagram of determining a detection region based on a longitudinal sliding region provided by an embodiment of the present application;

In this embodiment, the sliding region includes a horizontal sliding region and/or a longitudinal sliding region. The horizontal sliding region may be located at the horizontal edge region of the graphical user interface, and the longitudinal sliding region may be located at the longitudinal edge region of the graphical user interface.

For example, referring to FIG. 9, the graphical user interface may include three sliding regions, namely the longitudinal sliding regions 901 and 902 and the horizontal sliding region 903 in FIG. 9. Each sliding button may correspond to the respective first controls, and each first control can be slid on its corresponding sliding region.

In this embodiment, the steps of adjusting the position of the first control according to the movement of the touch point may be:

adjusting a position of the first control in the sliding region according to movement of the touch point.

Taking the sliding region 902 as an example, if the sliding region 902 includes the first control 904, the first control 904 can be controlled to slide up and down on the sliding region 902 according to the movement of the touch point, thereby adjusting the position of the first control 904 in the sliding region 902.

After the position of the first control is determined, a corresponding detection region may be determined according to the position of the first control. The detection region may be a detection line perpendicular to the sliding region or a region perpendicular to the sliding region with a preset width as a width value.

In a possible implementation, for example, referring to FIG. 10, it is assumed that the first operation at this time is the first operation acting on the horizontal sliding region 1000, and it is assumed that the touch point 1001 of the first operation moves from the first position 1002 to the second position 1003, the position of the first control in the sliding region can be adjusted according to the movement of the touch point. As shown in FIG. 10, the position of the first control in the sliding region is correspondingly adjusted from the first position 1002 to the second position 1003.

At this time, the first operation is located in the horizontal sliding region 1000, and the step of acquiring the detection region corresponding to the first operation may be, for example:

acquiring a detection line perpendicular to the horizontal sliding region or the region perpendicular to the horizontal sliding region with a preset width as a width value.

For example, referring to FIG. 10, a detection region 1005 may be acquired by acquiring a region perpendicular to the horizontal sliding region 1000 with a preset width as a width value.

In another possible implementation, for example, referring to FIG. 11, it is assumed that the first operation at this time is the first operation acting on the longitudinal sliding region 1101, and it is assumed that the position of the first control in the sliding region is adjusted according to the movement of the touch point at this time, it is determined that the position of the first control in the sliding region is the position 1102.

At this time, the first operation is located in the longitudinal sliding region 1101, and the step of acquiring the detection region corresponding to the first operation may be, for example:

acquiring a detection line perpendicular to the longitudinal sliding region or a region perpendicular to the longitudinal sliding region with a preset width as a width value.

For example, referring to FIG. 11, a detection region 1103 may be acquired by acquiring a region perpendicular to the longitudinal sliding region 1101 with a preset width as a width value.

Alternatively, the detection line perpendicular to the sliding region may also be acquired, so as to acquire the detection region, the implementation thereof is similar to that described above.

It is worth noting that the implementation of the sliding region and the first control in this embodiment can be for example as shown in the above figure; or, the number, the setting position, etc. of sliding regions can also be selected according to actual needs. The implementation of the first control can also be selected according to actual needs, which is not limited in this embodiment.

In the object selection method provided by the embodiment of the present application, by providing a sliding region, the position of the first control in the sliding region can be adjusted according to the movement of the touch point, which can make the movement of the first control more controllable.

On the basis of the above-mentioned embodiment, in another possible implementation, the first control may also be not displayed or does not exist in advance, and will be displayed after being triggered by a related operation. For example, the first control is displayed in the graphical user interface in response to the operation acting on the sliding region. A possible implementation of providing the first control is described below with reference to specific embodiments.

Description will be made with reference to FIG. 12, which is a schematic diagram of an implementation of displaying a first control provided by an embodiment of the present application.

Figure 12:
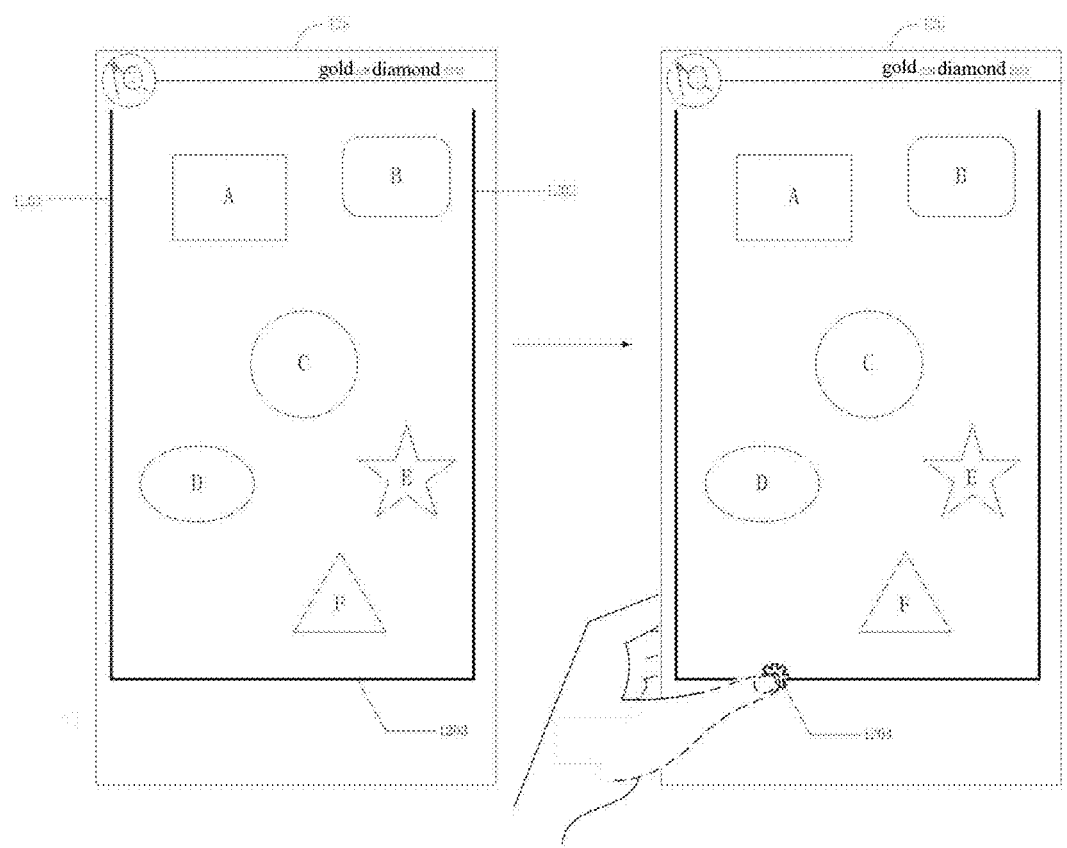
FIG. 12 is a schematic diagram of an implementation of displaying a first control provided by an embodiment of the present application.

Referring to FIG. 12, the graphical user interface may include three sliding regions, namely longitudinal sliding regions 1201 and 1202 and a horizontal sliding region 1203 in FIG. 12. As shown in 12*a* in FIG. 12, the first control is not displayed or does not exist in advance, and there are only respective sliding regions at this time.

In a possible implementation, in response to a second operation acting on the sliding region, it is controlled to display the first control in the graphical user interface, where the second operation is an operation continuous with the first operation.

It is assumed that the first operation is a sliding operation, the second operation may be a sliding operation that is continuous with the first operation, as shown in 12*b* in FIG. 12. In response to the second operation acting on the horizontal sliding region 1203, it is controlled to display the first control 1204 in the graphical user interface. For example, the first control 1204 may be displayed in the horizontal sliding region 1203, or may be displayed in other positions, which is not limited in this embodiment.

After the first control is displayed, the corresponding detection region may be determined according to the position of the first control, and the implementation thereof is similar to that described above, which will not be repeated here.

On the basis of the above-mentioned embodiment, the first operation may be the first operation acting on the sliding region, then the detection region may be directly acquired according to the position of the first operation in the sliding region, and there is no need to provide the first control. It will be described in specific embodiments with reference to FIG. 13 and FIG. 14 below, FIG. 13 is a schematic diagram of a detection line provided by an embodiment of the present application, FIG. 14 is another schematic diagram of a detection region provided by an embodiment of the present application.

Figure 13:
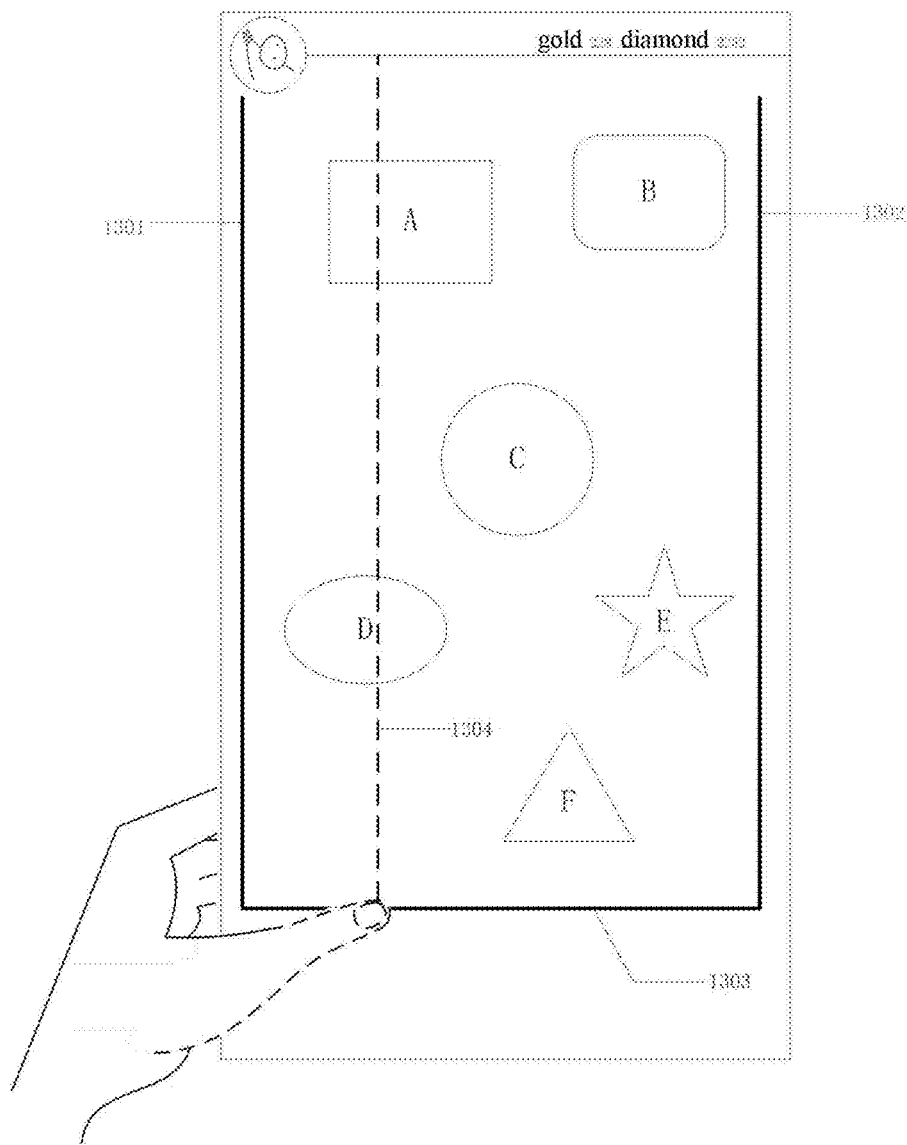
FIG. 13 is a schematic diagram of a detection line provided by an embodiment of the present application.
Figure 14:
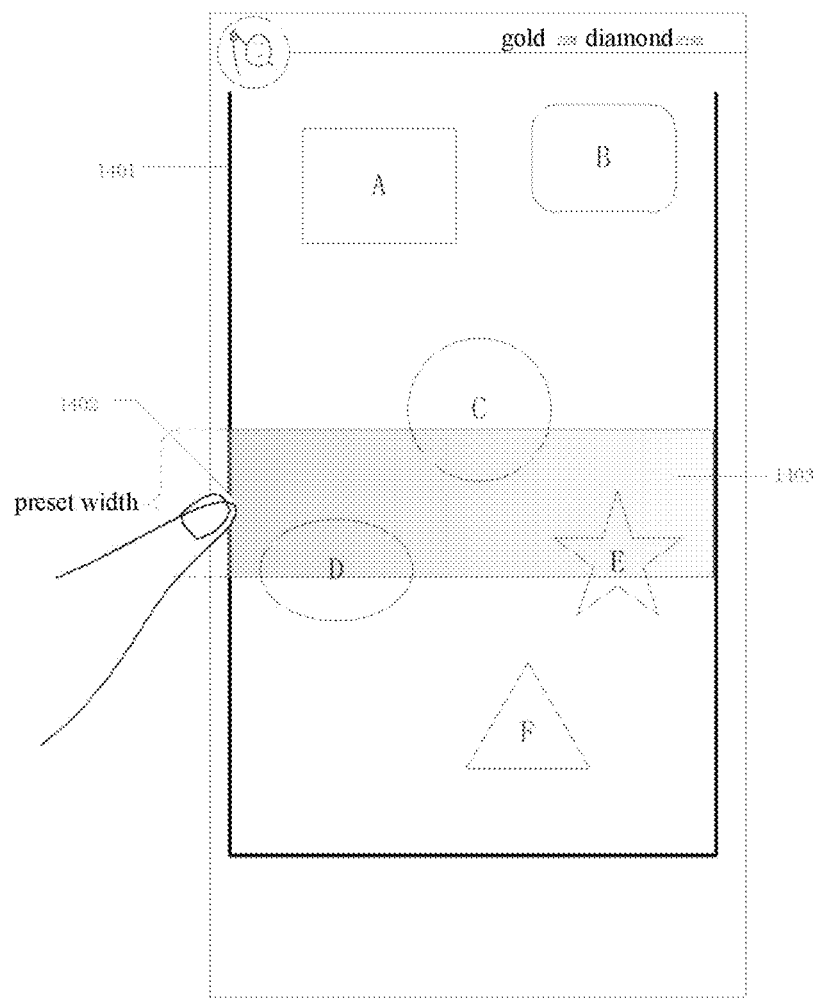
FIG. 14 is another schematic diagram of a detection region provided by an embodiment of the present application.

For example, referring to FIG. 13, the graphical user interface may include three sliding regions, namely longitudinal sliding regions 1301 and 1302 and a horizontal sliding region 1303 in FIG. 13.

In this embodiment, the first operation is a first operation acting on the sliding region, and the first operation is at least one of a click operation and a sliding operation. The detection region is a detection line perpendicular to the sliding region or a region perpendicular to the sliding region with a preset width as a width value.

In a possible implementation, for example, referring to FIG. 13, it is assumed that the first operation is the first operation acting on the horizontal sliding region 1303 at this time, the step of acquiring the detection region corresponding to the first operation may be, for example:

acquiring a detection line perpendicular to the horizontal sliding region or the region perpendicular to the horizontal sliding region with the preset width as the width value.

For example, referring to FIG. 13, a detection region 1303 can be acquired by acquiring a detection line 1304 perpendicular to the horizontal sliding region 1303.

In another possible implementation, for example, referring to FIG. 14, it is assumed that the first operation at this time is the first operation 1402 acting on the longitudinal sliding region 1401, and at this time, the step of acquiring the detection region corresponding to the first operation 1402 may be, for example:

acquiring the detection line perpendicular to the longitudinal sliding region or the region perpendicular to the longitudinal sliding region with the preset width as the width value.

For example, referring to FIG. 14, a detection region 1403 can be acquired by acquiring a region perpendicular to the longitudinal sliding region 1401 with a preset width as a width value.

It should be noted that the difference between FIG. 14 and FIG. 11 is that the first control does not need to be provided in the implementation of FIG. 14.

The object selection method provided by the embodiment of the present application directly acquires the detection region corresponding to the first operation through the first operation acting on the sliding region, which does not need to provide the first control, thereby improving the simplicity of the operation.

On the basis of the above embodiment, the step of controlling to provide at least one selection control in a display region corresponding to the first operation in the present application may include:

acquiring a positional relationship of at least one game interactive object overlapping with the detection region in the game screen;

providing at least one selection control in the display region based on the positional relationship.

For example, according to the positional relationship of at least one game interactive object in the game screen, at least one selection control can be provided in the display region according to the corresponding positional relationship. Alternatively, at least one selection control can be provided around the touch point of the first operation according to the positional relationship. Various possible implementations thereof can also be expanded according to actual requirements.

Figure 15:
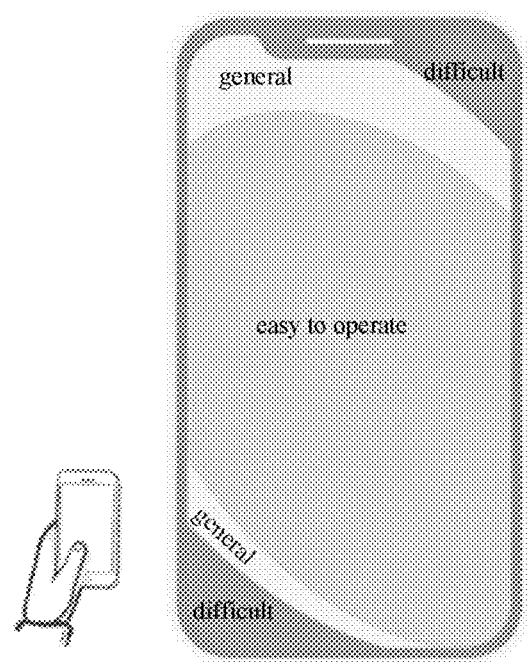
FIG. 15 is a schematic diagram of a hot zone range for left-handed operation provided by an embodiment of the present application.

Based on the above description, it can be determined that the sliding region in this embodiment may be located in the edge region of the game screen. Further, the sliding region in this embodiment may be located in the hot zone range of the one-handed operation in the edge region. The hot zone range for the one-handed operation will be described in combination with FIG. 15 and FIG. 16. FIG. 15 is a schematic diagram of a hot zone range for the left-handed operation provided by an embodiment of the present application, FIG. 16 is a schematic diagram of a hot zone range for the right-handed operation provided by an embodiment of the present application.

As shown in FIG. 15, as for the left-handed operation, the easy-to-operate range, the general range and the difficult range are shown in FIG. 15, and the hot zone range can be, for example, the easy-to-operate range, or it can also be a collection of the easy-to-operate range and the general range.

Figure 16:
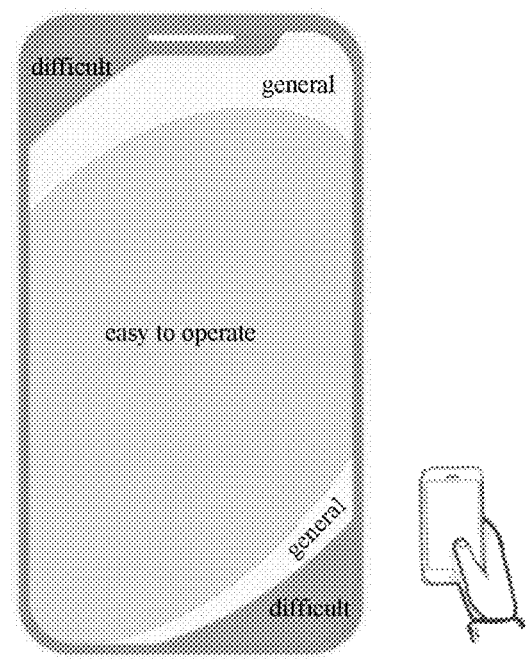
FIG. 16 is a schematic diagram of a hot zone range for right-handed operation provided by an embodiment of the present application.

As shown in FIG. 16, as for the right-handed operation, the easy-to-operate range, the general range and the difficult range are shown in FIG. 16, and the hot zone range can be, for example, the easy-to-operate range, or it can also be a collection of the easy-to-operate range and the general range.

In a possible implementation, the sliding region may be set at the edge region in combination with the hot zone range for the left-handed operation and the hot zone range for the right-handed operation.

By setting the sliding region in the hot zone range of the one-handed operation in the edge region, it can facilitate implementing the one-handed operation, thereby improving the convenience of selecting each game entry region.

On the basis of the above-mentioned embodiment, when a sliding region is included in the graphical user interface, in a possible implementation, when no operation on each sliding region is detected, each sliding region may be set to a hidden state. The description will be made with reference to FIG. 17, which is a schematic diagram of a sliding region in a hidden state provided by an embodiment of the present application.

Figure 17:
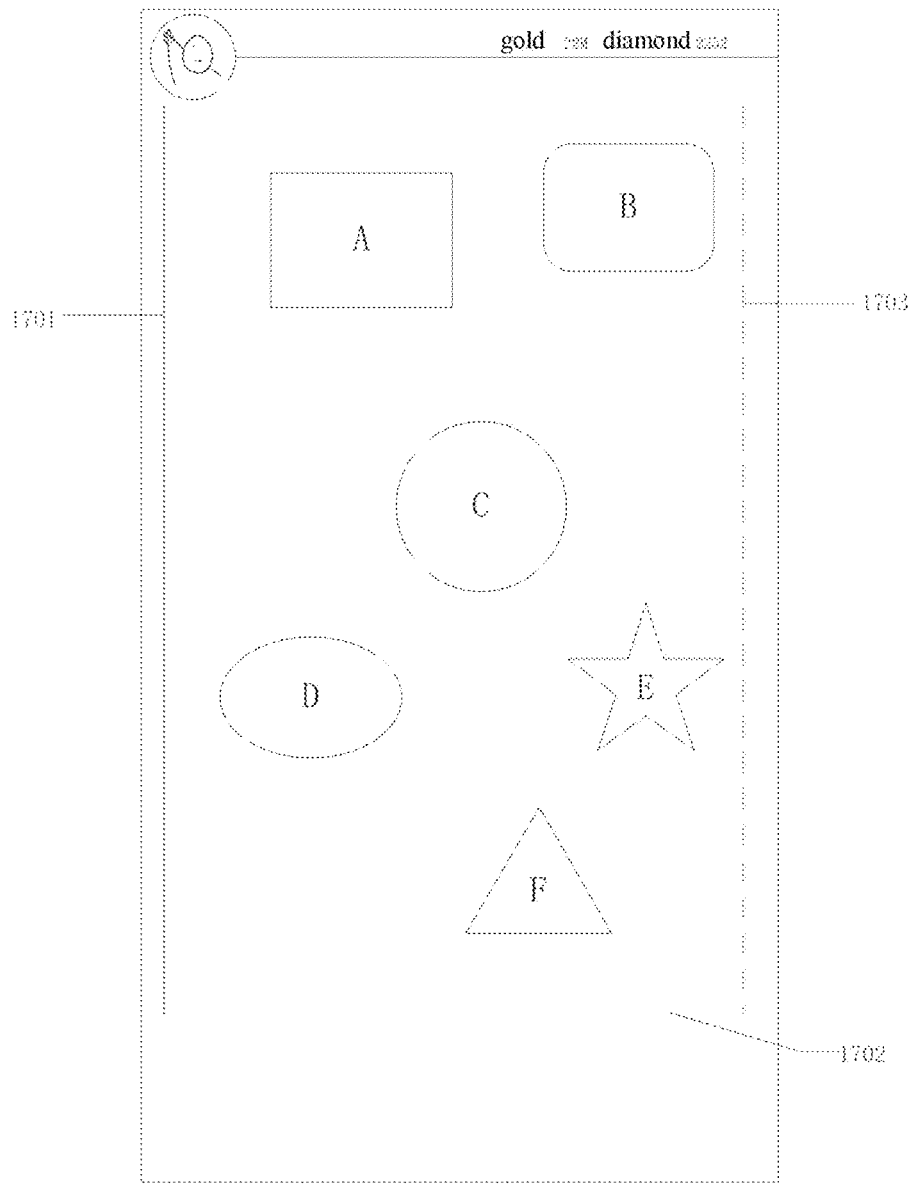
FIG. 17 is a schematic diagram of a sliding region in a hidden state provided by an embodiment of the present application.

The hidden state may be, for example, the transparency state of the sliding region 1701 shown in FIG. 17, or the non-displaying state of the sliding region 1702 shown in FIG. 17, or the dotted line state of the sliding region 1703 shown in FIG. 17. This embodiment does not limit the specific implementation of the hidden state, as long as the hidden state can weaken the display of the sliding region.

In this embodiment, by setting the sliding region to a hidden state when no operation on the sliding region is detected, the simplicity of the game screen can be improved, thereby improving the user's game experience.

Figure 18:
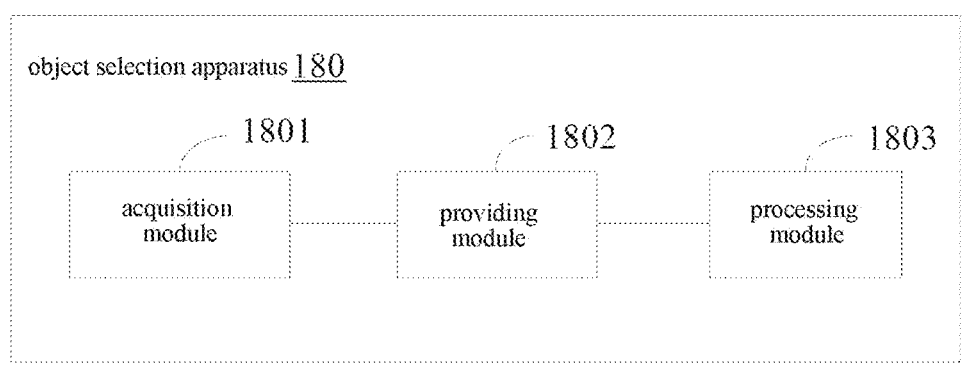
FIG. 18 is a schematic structural diagram of an object selection apparatus provided by an embodiment of the present application.

FIG. 18 is a schematic structural diagram of an object selection apparatus provided by an embodiment of the present application. As shown in FIG. 18, the apparatus 180 includes: an acquisition module 1801, a providing module 1802 and a processing module 1803.

The acquisition module 1801 is configured to acquire a detection region corresponding to a first operation in response to the first operation acting on the graphical user interface.

The acquisition module 1801 is further configured to acquire at least one game interactive object overlapping with the detection region.

The providing module 1802 is configured to control to provide at least one selection control in a display region corresponding to the first operation, wherein each selection control corresponds to one game interactive object.

The processing module 1803 is configured to, execute an interaction operation of the game interactive object corresponding to the selection control in response to a selection operation acting on the at least one selection control.

In a possible design, the acquisition module 1801 is specifically used for:

acquiring the detection region corresponding to a touch point of the first operation.

In one possible design, the providing module 1802 is also used for:

the graphical user interface providing a first control;

wherein, the acquisition module 1801 is specifically used for:

acquiring the touch point of the first operation, and determining that the touch point acts on a response region of the first control;

acquiring the detection region of the first control.

In a possible design, the acquisition module 1801 is specifically used for:

adjusting a position of the first control according to movement of the touch point;

determining the corresponding detection region according to the position of the first control.

In a possible design, the graphical user interface includes a sliding region, the sliding region is located at an edge region of the game screen, and the acquisition module 1801 is specifically used for:

adjusting the position of the first control in the sliding region according to the movement of the touch point.

In a possible design, the providing module 1802 is specifically used for:

controlling to display the first control in the graphical user interface in response to a second operation acting on the sliding region, wherein the second operation is an operation continuous with the first operation.

In a possible design, the graphical user interface includes a sliding region, the first operation is a first operation acting on the sliding region, and the first operation is at least one of a click operation and a sliding operation, wherein the detection region is a detection line perpendicular to the sliding region or a region perpendicular to the sliding region with a preset width as a width value.

In a possible design, the sliding region includes a horizontal sliding region and/or a longitudinal sliding region, the horizontal sliding region is located at a horizontal edge region of the graphical user interface, and the longitudinal sliding region is located at a longitudinal edge region of the graphical user interface; the acquisition module 1801 is used for at least one of the following steps:

acquiring a detection line perpendicular to the horizontal sliding region or a region perpendicular to the horizontal sliding region with a preset width as a width value, in response to determining that the first operation is located in the horizontal sliding region; and acquiring a detection line perpendicular to the longitudinal sliding region or a region perpendicular to the longitudinal sliding region with a preset width as a width value, in response to determining that the first operation is located in the longitudinal sliding region.

In a possible design, the providing module 1802 is specifically used for:

acquiring a positional relationship of at least one game interactive object overlapping with the detection region in the game screen;

providing at least one selection control in the display region based on the positional relationship.

In a possible design, the detection region and the display region are an identical region.

In a possible design, the acquisition module 1801 is also used for:

after acquiring at least one game interactive object overlapping with the detection region, acquiring an object identifier of the at least one game interactive object;

the providing module 1802 is also used for:

displaying the object identifier of the game interactive object corresponding to the selection control at periphery of each selection control.

In one possible design, the providing module 1802 is also used for:

setting the sliding region to a hidden state in response to detecting no operation on the sliding region.

The apparatus provided in this embodiment can be used to implement the technical solutions of the foregoing method embodiments, and the implementation principles and technical effects thereof are similar, and details are not described herein again in this embodiment.

Figure 19:
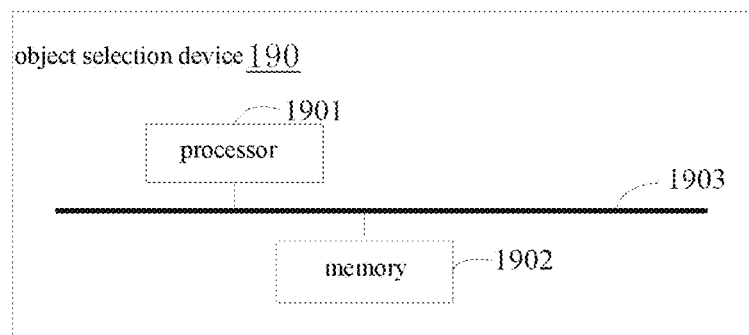
FIG. 19 is a schematic diagram of a hardware structure of an object selection device provided by an embodiment of the present application.

FIG. 19 is a schematic diagram of the hardware structure of an object selection device provided by an embodiment of the present application. As shown in FIG. 19, the object selection device 190 of this embodiment includes: a processor 1901 and a memory 1902.

The memory 1902 is used for storing computer-executable instructions.

The processor 1901 is configured to execute the computer-executable instructions stored in the memory, so as to implement each step performed by the object selection method in the above-mentioned embodiment. For details, please refer to the relevant descriptions in the foregoing method embodiments.

Optionally, the memory 1902 may be independent or integrated with the processor 1901.

When the memory 1902 is set independently, the object selection device further includes a bus 1903 for connecting the memory 1902 and the processor 1901.

Embodiments of the present application further provide a computer-readable storage medium, where computer-executable instructions are stored in the computer-readable storage medium. When a processor executes the computer-executable instructions, the object selection method performed by the object selection device described above is implemented.

In some embodiments, said acquiring a detection region corresponding to a first operation comprises:

acquiring the detection region in accordance with a touch point of the first operation.

In some embodiments, the method further comprises:

the graphical user interface providing a first control;

wherein said acquiring the detection region corresponding to a touch point of the first operation comprises:

acquiring the touch point of the first operation, and determining that the touch point acts on a response region of the first control;

acquiring the detection region of the first control.

In some embodiments, said acquiring the detection region of the first control comprises:

adjusting a position of the first control according to movement of the touch point;

determining the detection region in accordance with the position of the first control.

In some embodiments, the graphical user interface comprises a sliding region, the sliding region is located at an edge region of the game screen, and said adjusting a position of the first control according to movement of the touch point is adjusting the position of the first control in the sliding region according to the movement of the touch point.

In some embodiments, said graphical user interface providing a first control comprises:

controlling to display the first control in the graphical user interface in response to a second operation acting on the sliding region, wherein the second operation is an operation continuous with the first operation.

In some embodiments, the graphical user interface comprises a sliding region, the first operation is a first operation acting on the sliding region, and the first operation is at least one of the following: a tap operation and a sliding operation; wherein the detection region is a detection line perpendicular to the sliding region or a region perpendicular to the sliding region with a preset width as a width value.

In some embodiments, the sliding region comprises a horizontal sliding region and/or a longitudinal sliding region, the horizontal sliding region is located at a horizontal edge region of the graphical user interface, and the longitudinal sliding region is located at a longitudinal edge region of the graphical user interface; said acquiring a detection region corresponding to a first operation comprises at least one of:
  acquiring a detection line perpendicular to the horizontal sliding region or a region perpendicular to the horizontal sliding region with a preset width as a width value, in response to determining that the first operation is located in the horizontal sliding region; and
  acquiring a detection line perpendicular to the longitudinal sliding region or a region perpendicular to the longitudinal sliding region with a preset width as a width value, in response to determining that the first operation is located in the longitudinal sliding region.

In some embodiments, said controlling to provide at least one selection control in a display region corresponding to the first operation comprises:
  acquiring a positional relationship of at least one game interactive object overlapping with the detection region in the game screen;
  providing at least one selection control in the display region based on the positional relationship.

In some embodiments, the detection region and the display region are an identical region.

In some embodiments, after acquiring at least one game interactive object overlapping with the detection region, the method further comprises:
  acquiring an object identifier of the at least one game interactive object;
  the method further comprises:
  displaying the object identifier of the game interactive object corresponding to the selection control at periphery of each selection control.

In some embodiments, the method further comprises:
  setting the sliding region to a hidden state in response to detecting no operation on the sliding region.

Through the above technical solutions, it provides an object selection method, so as to realize simple and efficient selection of each game interactive object in the case of one-handed operation.

In the several embodiments provided in this application, it should be understood that the disclosed device and method may be implemented in other manners. For example, the device embodiments described above are only illustrative. For example, the division of the modules is only a logical function division. In actual implementation, there may be other division manners. For example, multiple modules may be combined or integrated into another system, or some features can be ignored, or not implemented. On the other hand, the shown or discussed mutual coupling or direct coupling or communication connection may be through some interfaces, indirect coupling or communication connection of apparatuses or modules may be in electrical, mechanical or other forms.

The above-mentioned integrated modules implemented in the form of software functional modules may be stored in a computer-readable storage medium. The above-mentioned software function modules are stored in a storage medium, and include several instructions to enable a computer device (which may be a personal computer, a server, or a network device, etc.) or a processor to execute some steps of the method in various embodiments of the present application.

It should be understood that the above processor may be a central processing unit (CPU), and may also be other general-purpose processors, digital signal processors (DSP), application specific integrated circuits (ASIC) and so on. A general purpose processor may be a microprocessor or the processor may be any conventional processor or the like. The steps of the method disclosed in conjunction with the present disclosure can be directly embodied as executed by a hardware processor, or executed by a combination of hardware and software modules in the processor.

The memory may include high-speed RAM memory, and may also include non-volatile storage NVM, such as at least one magnetic disk memory, and may also be a U disk, a removable hard disk, a read-only memory, a magnetic disk or an optical disk, and the like.

The bus may be an Industry Standard Architecture (ISA) bus, a Peripheral Component (PCI) bus, or an Extended Industry Standard Architecture (EISA) bus, or the like. The buses can be classified into address buses, data buses, control buses and so on. For convenience of representation, the buses in the drawings of the present application are not limited to only one bus or one type of buses.

The above storage medium can be implemented by any type of volatile or non-volatile storage device or a combination thereof, such as static random access memory (SRAM), electrically erasable programmable read only memory (EEPROM), erasable Except Programmable Read Only Memory (EPROM), Programmable Read Only Memory (PROM), Read Only Memory (ROM), Magnetic Memory, Flash Memory, Magnetic Disk or Optical Disk. A storage medium can be any available medium that can be accessed by a general purpose or special purpose computer.

Those of ordinary skill in the art can understand that all or part of the steps of implementing the above method embodiments may be completed by hardware related to program instructions. The aforementioned program can be stored in a computer-readable storage medium. When the program is executed, the steps including the above method embodiments are executed; and the foregoing storage medium includes: ROM, RAM, magnetic disk or optical disk and other media that can store program codes.

In the end, it should be noted that the above embodiments are only used to illustrate the technical solutions of the present application, but not to limit them; although the present application has been described in detail with reference to the foregoing embodiments, those of ordinary skill in the art should understand that the technical solutions described in the foregoing embodiments can still be modified, or some or all of the technical features thereof can be equivalently replaced; and these modifications or replacements do not make the essence of the corresponding technical solutions deviate from the scope of technical solutions of embodiments of the present application.

What is claimed is:

1. An object selection method, wherein a graphical user interface is provided through a first terminal device, the graphical user interface comprises a game screen, and the game screen comprises at least one game interactive object, the method comprises:
  acquiring a detection region corresponding to a first operation in response to the first operation acting on the graphical user interface, wherein the detection region is displayed in a preset state, and the preset state is a state of a light bar, highlighting, or a floating window;

acquiring at least one game interactive object overlapping with the detection region;

controlling to provide at least one selection control in a display region corresponding to the first operation, wherein each selection control corresponds to one game interactive object; and executing an interaction operation of the game interactive object corresponding to the selection control in response to a selection operation acting on the at least one selection control, wherein acquiring the detection region corresponding to the first operation comprises:

acquiring the detection region in accordance with a touch point of the first operation, wherein the detection region is a region with a preset length and a preset width in a preset direction of the first operation by serving the touch point as a starting point, wherein the first terminal device comprises a display screen and a processor, the display screen is configured for presenting the graphical user interface, and the processor is configured for running a game, generating the graphical user interface, and controlling display of the graphical user interface on the display screen.

2. The method according to claim 1, further comprising:
providing a first control on the graphical user interface;
wherein said acquiring the detection region corresponding to a touch point of the first operation comprises:
acquiring the touch point of the first operation, and determining that the touch point acts on a response region of the first control;
acquiring the detection region of the first control.

3. The method according to claim 2, wherein said acquiring the detection region of the first control comprises:
adjusting a position of the first control according to movement of the touch point;
determining the detection region in accordance with the position of the first control.

4. The method according to claim 3, wherein the graphical user interface comprises a sliding region, the sliding region is located at an edge region of the game screen, and said adjusting a position of the first control according to movement of the touch point is adjusting the position of the first control in the sliding region according to the movement of the touch point.

5. The method according to claim 4, wherein said graphical user interface providing a first control comprises:
controlling to display the first control in the graphical user interface in response to a second operation acting on the sliding region, wherein the second operation is an operation continuous with the first operation.

6. The method according to claim 4, further comprising:
setting the sliding region to a hidden state in response to detecting no operation on the sliding region.

7. The method according to claim 1, wherein the graphical user interface comprises a sliding region, the first operation is a first operation acting on the sliding region, and the first operation is at least one of the following: a tap operation and a sliding operation; wherein the detection region is a detection line perpendicular to the sliding region or a region perpendicular to the sliding region with a preset width as a width value.

8. The method according to claim 7, wherein the sliding region comprises at least one of the following: a horizontal sliding region, and a longitudinal sliding region; wherein the horizontal sliding region is located at a horizontal edge region of the graphical user interface, and the longitudinal sliding region is located at a longitudinal edge region of the graphical user interface; said acquiring a detection region corresponding to a first operation comprises at least one of:

acquiring a detection line perpendicular to the horizontal sliding region or a region perpendicular to the horizontal sliding region with a preset width as a width value, in response to determining that the first operation is located in the horizontal sliding region; and acquiring a detection line perpendicular to the longitudinal sliding region or a region perpendicular to the longitudinal sliding region with a preset width as a width value, in response to determining that the first operation is located in the longitudinal sliding region.

9. The method according to claim 1, wherein said controlling to provide at least one selection control in a display region corresponding to the first operation comprises:
acquiring a positional relationship of at least one game interactive object overlapping with the detection region in the game screen;
providing at least one selection control in the display region based on the positional relationship.

10. The method according to claim 1, wherein the detection region and the display region are an identical region.

11. The method according to claim 1, wherein after acquiring at least one game interactive object overlapping with the detection region, the method further comprises:
acquiring an object identifier of the at least one game interactive object;
the method further comprises:
displaying the object identifier of the game interactive object corresponding to the selection control at periphery of each selection control.

12. The method according to claim 1, wherein said acquiring a detection region corresponding to a first operation comprises:
acquiring a region of a preset range around a touch point of the first operation.

13. The method according to claim 1, wherein at least one game interactive object overlapping with the detection region indicates that a game interactive object is completely located within the detection region.

14. The method according to claim 1, wherein at least one game interactive object overlapping with the detection region indicates that a part of a game interactive object is located within the detection region.

15. The method according to claim 1, wherein the game interactive object is a game entry.

16. An object selection apparatus, providing a graphical user interface through a first terminal device, the graphical user interface comprising a game screen, and the game screen comprising at least one game interactive object, the apparatus comprising:
a memory for storing programs; and
a processor for executing the program stored in the memory,
wherein the processor is configured to:
acquire a detection region corresponding to a first operation in response to the first operation acting on the graphical user interface, wherein the detection region is displayed in a preset state, and the preset state is a state of a light bar, highlighting, or a floating window;
acquire at least one game interactive object overlapping with the detection region;
control to provide at least one selection control in a display region corresponding to the first operation, wherein each selection control corresponds to one game interactive object; and execute an interaction operation of the game interactive object corresponding to the selection control in response to a selection operation acting on the at least one selection control, wherein the processor is further configured to:

acquire the detection region in accordance with a touch point of the first operation, wherein the detection region is a region with a preset length and a preset width in a preset direction of the first operation by serving the touch point as a starting point, wherein the first terminal device comprises a display screen and a processor, the display screen is configured for presenting the graphical user interface, and the processor is configured for running a game, generating the graphical user interface, and controlling display of the graphical user interface on the display screen.

17. A non-transitory computer readable storage medium, comprising instructions which cause a computer to perform an object selection method, wherein a graphical user interface is provided through a first terminal device, the graphical user interface comprises a game screen, and the game screen comprises at least one game interaction object, the method comprises:

acquiring a detection region corresponding to a first operation in response to the first operation acting on the graphical user interface, wherein the detection region is displayed in a preset state, and the preset state is a state of a light bar, highlighting, or a floating window;

acquiring at least one game interaction object overlapping with the detection region;

controlling to provide at least one selection control in a display region corresponding to the first operation, wherein each selection control corresponds to one game interaction object; and executing an interaction operation of the game interaction object corresponding to the selection control in response to a selection operation acting on the at least one selection control, wherein acquiring the detection region corresponding to the first operation comprises:

acquiring the detection region in accordance with a touch point of the first operation, wherein the detection region is a region with a preset length and a preset width in a preset direction of the first operation by serving the touch point as a starting point, wherein the first terminal device comprises a display screen and a processor, the display screen is configured for presenting the graphical user interface, and the processor is configured for running a game, generating the graphical user interface, and controlling display of the graphical user interface on the display screen.

* * * * *